(12) United States Patent
Pidan et al.

(10) Patent No.: US 10,503,633 B2
(45) Date of Patent: Dec. 10, 2019

(54) SYMBOLIC EXECUTION OF ALTERNATIVE BRANCHES

(71) Applicant: INTERNATIONAL BUSINESS MACHINES CORPORATION, Armonk, NY (US)

(72) Inventors: Dmitry Pidan, Netanya (IL); Tatyana Veksler, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/084,617

(22) Filed: Mar. 30, 2016

(65) Prior Publication Data
US 2017/0286271 A1 Oct. 5, 2017

(51) Int. Cl.
*G06F 9/44* (2018.01)
*G06F 11/36* (2006.01)

(52) U.S. Cl.
CPC ...... *G06F 11/3668* (2013.01); *G06F 11/3688* (2013.01)

(58) Field of Classification Search
CPC ............ G06F 11/3608; G06F 11/3612; G06F 11/3636; G06F 8/42; G06F 8/433; G06F 9/45516
See application file for complete search history.

(56) References Cited

U.S. PATENT DOCUMENTS

| | | | |
|---|---|---|---|
| 9,141,354 B2 | 9/2015 | Kuznetsov et al. | |
| 2005/0060691 A1* | 3/2005 | Das | G06F 8/433 717/132 |
| 2007/0168988 A1* | 7/2007 | Eisner | G06F 9/44589 717/126 |
| 2008/0005619 A1* | 1/2008 | Arons | G06F 11/3604 714/38.1 |
| 2012/0084759 A1* | 4/2012 | Candea | G06F 11/3612 717/126 |
| 2012/0311545 A1* | 12/2012 | Li | G06F 11/3676 717/132 |
| 2013/0055210 A1* | 2/2013 | Murthy | G06F 11/3608 717/126 |

(Continued)

OTHER PUBLICATIONS

Volodymyr Kuznetsov et al., "Efficient State Merging in Symbolic Execution", PLDI '12 Proceedings of the 33rd ACM SIGPLAN Conference on Programming Language Design and Implementation, pp. 193-204, 2012.

(Continued)

*Primary Examiner* — Duy Khuong T Nguyen
(74) *Attorney, Agent, or Firm* — Gregory J. Kirsch

(57) ABSTRACT

Method, apparatus and product for symbolic execution of alternative branches. The method comprising reaching, during symbolic execution of a Control Flow Graph (CFG) of a program, a branching node in the CFG with a first symbolic state, wherein the branching has at least a first branch and a second branch, wherein the first and second branches end at a joining node in the CFG. The method further comprises symbolically executing the first branch using the first symbolic state so as to determine a second symbolic state. The method further comprises symbolically executing the second branch using the second symbolic state so as to determine a third symbolic state. Accordingly, the third symbolic state is based on sequential symbolic execution of alternative branches.

16 Claims, 3 Drawing Sheets

(56) References Cited

U.S. PATENT DOCUMENTS

| | | | |
|---|---|---|---|
| 2013/0085979 A1* | 4/2013 | Grechanik | G06N 5/025 |
| | | | 706/48 |
| 2013/0091495 A1* | 4/2013 | Garg | G06F 11/3684 |
| | | | 717/131 |
| 2015/0074652 A1* | 3/2015 | Chockler | G06F 11/3608 |
| | | | 717/126 |
| 2015/0269061 A1* | 9/2015 | Li | G06F 11/3684 |
| | | | 717/131 |
| 2015/0293831 A1 | 10/2015 | Li et al. | |
| 2015/0339217 A1* | 11/2015 | Avgerinos | G06F 11/3608 |
| | | | 717/132 |

* cited by examiner

SYMBOLIC EXECUTION OF ALTERNATIVE BRANCHES

TECHNICAL FIELD

The present disclosure relates to symbolic execution of computer programs in general, and to symbolic execution of computer programs having alternative branches, in particular.

BACKGROUND

Symbolic execution combines explicit exploration of every feasible execution path of a computer program with a symbolic representation of input values. Symbols are injected instead of input values, where a symbol represents any value in the corresponding domain. Using the symbolic values, properties relating to every potential execution of the execution path may be analyzed. For example, absence of failures on all possible inputs that lead the program through this execution path may be determined or a counter-example may be provided to demonstrate such failure.

Symbolic execution can be implemented in a variety of manners. In one implementation, the computer program is compiled to create an executable file which is configured to perform the symbolic execution when executed. In an alternative implementation, an interpreter is used to interpret the computer program and simulate symbolic execution thereof. In the present disclosure, "symbolic execution" covers both these implementations, as well as any other implementation.

Symbolic execution, however, suffers from a drawback known as path explosion. As each execution path of the program is traversed, symbolic execution may not be feasible when there are many execution paths that need to be traversed. Such may be the case when, during execution, there is a sequence of branches each of which spawns more than one feasible sub-path, thereby increasing the number of the total paths exponentially in the number of branches.

BRIEF SUMMARY

One exemplary embodiment of the disclosed subject matter is a computer-implemented method for performing symbolic execution of a computer program, wherein the symbolic execution traverses a Control Flow Graph (CFG) of the computer program while updating a symbolic state of the computer program, the method comprising: reaching a branching node in the CFG with a first symbolic state, wherein the branching has at least a first branch and a second branch, wherein the first and second branches end at a joining node in the CFG; symbolically executing the first branch using the first symbolic state, whereby a second symbolic state is determined; and symbolically executing the second branch using the second symbolic state, whereby a third symbolic state is determined, the third symbolic state is based on sequential symbolic execution of alternative branches.

Another exemplary embodiment of the disclosed subject matter is an apparatus for performing symbolic execution of a computer program, wherein the symbolic execution traverses a Control Flow Graph (CFG) of the computer program while updating a symbolic state of the computer program, wherein the apparatus comprising a processor being adapted to perform the steps of: reaching a branching node in the CFG with a first symbolic state, wherein the branching has at least a first branch and a second branch, wherein the first and second branches end at a joining node in the CFG; symbolically executing the first branch using the first symbolic state, whereby a second symbolic state is determined; and symbolically executing the second branch using the second symbolic state, whereby a third symbolic state is determined, the third symbolic state is based on sequential symbolic execution of alternative branches.

Yet another exemplary embodiment of the disclosed subject matter is a computer program product for performing symbolic execution of a computer program, wherein the symbolic execution traverses a Control Flow Graph (CFG) of the computer program while updating a symbolic state of the computer program, wherein the computer program product comprising a computer readable storage medium retaining program instructions, which program instructions when read by a processor, cause the processor to perform a method comprising: reaching a branching node in the CFG with a first symbolic state, wherein the branching has at least a first branch and a second branch, wherein the first and second branches end at a joining node in the CFG; symbolically executing the first branch using the first symbolic state, whereby a second symbolic state is determined; and symbolically executing the second branch using the second symbolic state, whereby a third symbolic state is determined, the third symbolic state is based on sequential symbolic execution of alternative branches.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
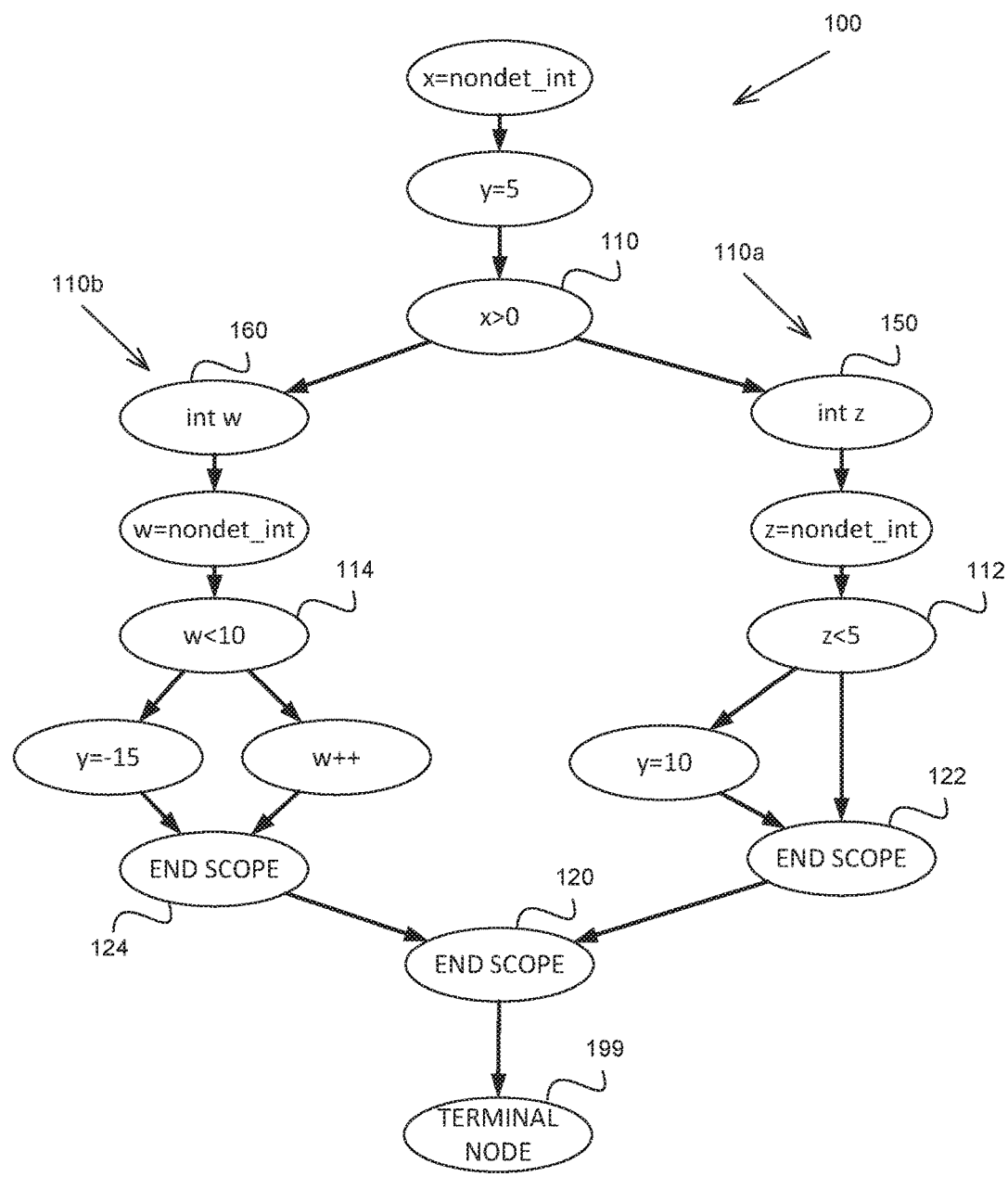
FIG. 1 shows a schematic illustration of a Control Flow Graph (CFG), in accordance with some exemplary embodiments of the disclosed subject matter.

One technical problem dealt with by the disclosed subject matter is to provide for a method, system or product capable of symbolic execution of a program comprising alternative branches.

Symbolic execution may be performed by traversing a Control Flow Graph (CFG) of the computer program. The CFG is a static representation of the computer program which comprises nodes representing instructions in the program, and directed edges connect two nodes (source node and target node) if after executing the instruction of the source node, the control flow may pass to the instruction of the target node.

Symbolic execution may lead to a path explosion problem. The number of feasible execution paths may be exponential, and the symbolic execution tool may be unable to provide meaningful verification result. The problem may occur when a symbolic execution tool reaches nondeterministic branches, for example, in case a branch having a nondeterministic branch condition appears inside a loop. In such a case, an efficient symbolic execution of the alternative branches may be desired so as to allow the symbolic execution of the computer program to be feasible.

Path explosion problem harms scalability of tools that apply symbolic execution on the code. First, proving the code correctness may become an infeasible task since both time and memory constraints become insufficient for covering this huge number of spawn execution paths. On the other hand, bug hunting abilities may also be harmed because the tool may get stuck in spawning more and more feasible execution paths, without making a real progress into the more interesting areas in the code.

One technical solution is to symbolically execute alternative branches in sequential manner. Without loss of generality, consider a branching node having two alternative branches, such as an if-then-else control scheme. A first branch may be symbolically executed until reaching a joining node in the CFG. The symbolic state that was determined during the symbolic execution of the first branch is manipulated and used again as if it was the state when the branching node was reached. Then, the second branch is symbolically executed using the same symbolic state.

In some exemplary embodiments, both execution paths are performed sequentially and without splitting the state. Instead, If-Then-Else (ITE) constructs may be used where the condition of the ITE construct is a condition required to follow the execution path in which the instruction was performed. For example, the ITE construct may be a triplet (exp, $value_1$, $value_2$), where exp is a condition, if the condition is true than the value of the ITE construct is $value_1$, otherwise, the value is $value_2$. When a variable having a value oldValue is assigned a newValue in a branch having a condition cond, the variable may be assigned as the following ITE construct: (cond, newValue, oldValue).

In some exemplary embodiments, assignments to global variables or other variables whose scope is not completely internal to the executed branch, may be symbolically executed using an ITE construct or otherwise using a conditional assignment that is guarded by the branch condition of the branch. Additionally or alternatively, assignment to local variables whose scope is completely internal to the executed branch may be symbolically executed using an unconditioned assignment.

In some exemplary embodiments, the disclosed subject matter may identify nondeterministic branches and avoid splitting of execution to multiple paths on those branches. Instead, both sides of a branch are treated in a single symbolic execution. In some exemplary embodiments, outcomes of instructions having a side effect that is external to the scope of a branch, such as assigning values to non-local variables, outputting messages to the user, assertions, or the like, may be conditioned on the branch condition of the respective branch. In such a manner, the branching conditions may be embedded into symbolic expressions in the symbolic state.

In some exemplary embodiments, the point of splitting may be identified dynamically during symbolic execution, upon reaching a branching node and before reaching a joining node. The point of splitting may be a branching node having two or more feasible branches that join in a single joining node. In some exemplary embodiments, the joining node may be identified on demand or statically. The joining node may be identified, for example, by analyzing the CFG to identify a cut of size one after the branching node. The cut may define a cut-set consisting of a single edge. A source node or target node of that single edge may be considered as the joining node as all paths from the branching node that reach the end of the program must pass through that node. In some exemplary embodiments, if a joining node cannot be located, the optimization disclosed herein may not be performed for the branching node.

In some exemplary embodiments, the symbolic execution may be a concolic execution which retains a state that comprises a symbolic state as well as a concrete state. The concrete state may be used to simplify some computations, such as, for example, detect a single reachable branch when reaching a branching node without requiring extensive computations.

One technical effect of the disclosed subject matter may be that the symbolic states that represent merged branches are built during execution. As a result, there's no need to store states that may be potentially merged later on.

Another technical effect is that the ITE constructs or other conditioned constructs are built only where necessary, such as only for variables that can really have different values on both execution paths, as determined on the fly on not in a static manner. As a result, the symbolic state may be relatively compact.

Yet another technical effect is the option to determine on the fly which branch may be merged. Analysis of the CFG may be used to decide whether or not to merge branches. For this purpose, dynamic information, such as number of times the same instruction produced a state split, may be used. Additionally or alternatively, static knowledge gathered from the CFG may be used, such as identifying that a state split that may have a high potential to cause path explosion as is the case in a branching instruction occurring within a loop.

Referring now to FIG. 1 showing a schematic illustration of a CFG, in accordance with some exemplary embodiments of the disclosed subject matter.

FIG. 1 shows a CFG of the following computer program:

```
 1: int main( )
 2: {
 3:    int x = nondet_int( );
 4:    int y = 5;
 5:    if (x > 0) {
 6:       int z = nondet_int( );
 7:       if (z < 5)
 8:          ;
 9:       else
10:          y = 10;
11:    }
12:    else {
13:       int w = nondet_int( );
14:       if (w < 10)
15:          w++;
16:       else
17:          y = -15;
18:    }
19: }
```

CFG 100 includes three branching nodes: Node 110, Node 112 and Node 114. Each branching node is conditioned on a symbolic expression such that both branches are feasible. For example, in line 5, the condition is (x>0). As x is assigned a nondeterministic value in line 3, the condition may be evaluated to TRUE for some input and to FALSE for other input. In case in Node 110, the condition is evaluated to TRUE, a Branch 110*a*, comprising a plurality of nodes starting from Node 150 and ending in Node 120, is executed. Otherwise, Branch 110*b*, comprising the nodes starting from Node 160 and ending in Node 120, is executed. Branches 110*a*, 110*b* may be referred to as alternative branches, as the branching condition in Branching Node 110 may determine which of the branches is to be executed, and each of which is an alternative branch that may be executed until reaching a joining node—Node 120.

Identifying a joining node may be performed by searching for a cut of size one between the branching node (e.g., Node 110) and the terminal CFG node (e.g., Node 199). If such a cut is detected, a node through which all paths pass from the branching node to the terminal CFG node can be located. For Nodes 110, 112, 114, the joining nodes may be detected as Nodes 120, 122, 124, respectively.

In some cases the joining node cannot be found. One typical case may be when the search is started from the branch node which originates from a loop. When the joining node for a branch is not located, the optimized handling of the branch provided by the disclosed subject matter may not be applied to the branching node.

Figure 2:
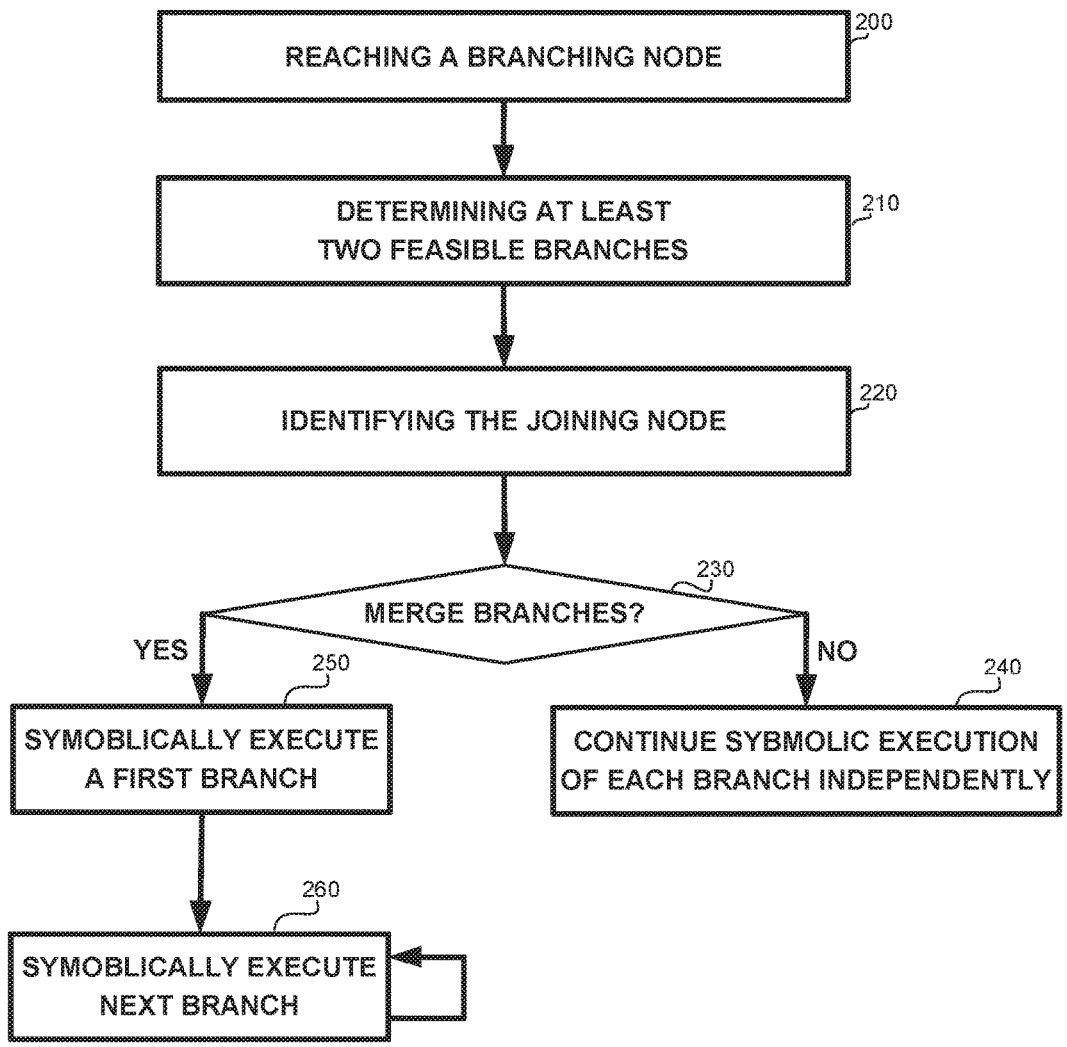
FIG. 2 shows a flowchart diagram, in accordance with some exemplary embodiments of the subject matter.

Referring now to FIG. 2 showing a flowchart diagram of a method, in accordance with the disclosed subject matter.

On Step 200, symbolic execution reaches a branching node. The symbolic execution reaches the branching node with a symbolic state, denoted as S.

On Step 210, it may be determined that the branching node has two or more feasible branches. In some exemplary embodiments, a condition of a branch may be evaluated, based on the symbolic state, S, to determine if for some input, the branch may be taken. In some exemplary embodiments, given the branch condition cond, a Constraint Satisfaction Problem (CSP) or Boolean Satisfiability Problem (SAT) may be defined to reflect cond and a solver may be used to determine whether the problem is satisfiable and therefore cond can be evaluated to TRUE under some input, given the symbolic values defined in S.

Additionally or alternatively, under concolic execution, the concrete state may be used to determine which branch is taken for the concrete state thereby determining a single feasible branch and avoiding computations regarding such branch.

On Step 220, a joining node may be identified for all branches. The joining node may be identified by detecting a cut of size one in the CFG or in a sub-graph of the CFG beginning in the branching node. The cut may partition the CFG (or sub-graph thereof) to two partitions, one of which comprises the branching node, the other comprises the terminal node of the CFG, such that a single edge crosses between one partition to the other.

On Step 230, a dynamic decision as to whether or not to merge the branches may be determined. The decision may depend on the values of S, on dynamic information obtained during symbolic execution such as a number of times the branching node caused a splitting of the execution path during the symbolic execution being above a threshold, on static analysis information, such as the location of the branching node being inside a loop, or on similar information. In case the branches are merged, Step 250 is performed. Otherwise, Step 240 is performed.

On Step 240, symbolic execution occurs without merging the branches. Based on the state S, symbolic execution of each feasible branch is performed independently.

On Step 250, symbolic execution of a first branch is performed based on state S. During symbolic execution if an assignment instruction is to be performed, a conditional assignment is performed that is based on the branch condition of the first branch. In some exemplary embodiments, each operation that has a side effect external to the first branch may be conditioned on the branch condition. Additionally or alternatively, instructions having no side effect, such as an assignment of a value to a local variable whose scope is completely internal to the first branch may be performed in an unconditional manner.

The symbolic execution of the first branch continues until reaching the joining node with a modified symbolic state, referred to as a second symbolic state S'.

On Step 260, instead of continuing symbolic execution from the joining node using S' onwards to following nodes according to the CFG, the state S' is used to symbolically execute the second branch in a similar manner to that described in Step 250. After the execution of the second branch a third symbolic state is obtained.

In some exemplary embodiments, there may be more than two alternative branches. Step 260 may be performed iteratively for each such branch, so as to sequentially execute all the branches and update a same symbolic state in the process.

The symbolic state obtained after sequential execution of the branches may comprise conditional assignments that are conditioned on different branch conditions, thereby merging the control flow of the branches and transforming the control split into a data split. In some exemplary embodiments, unconditional assignments of local variables in each branch may also be represented in the symbolic state.

Figure 3:
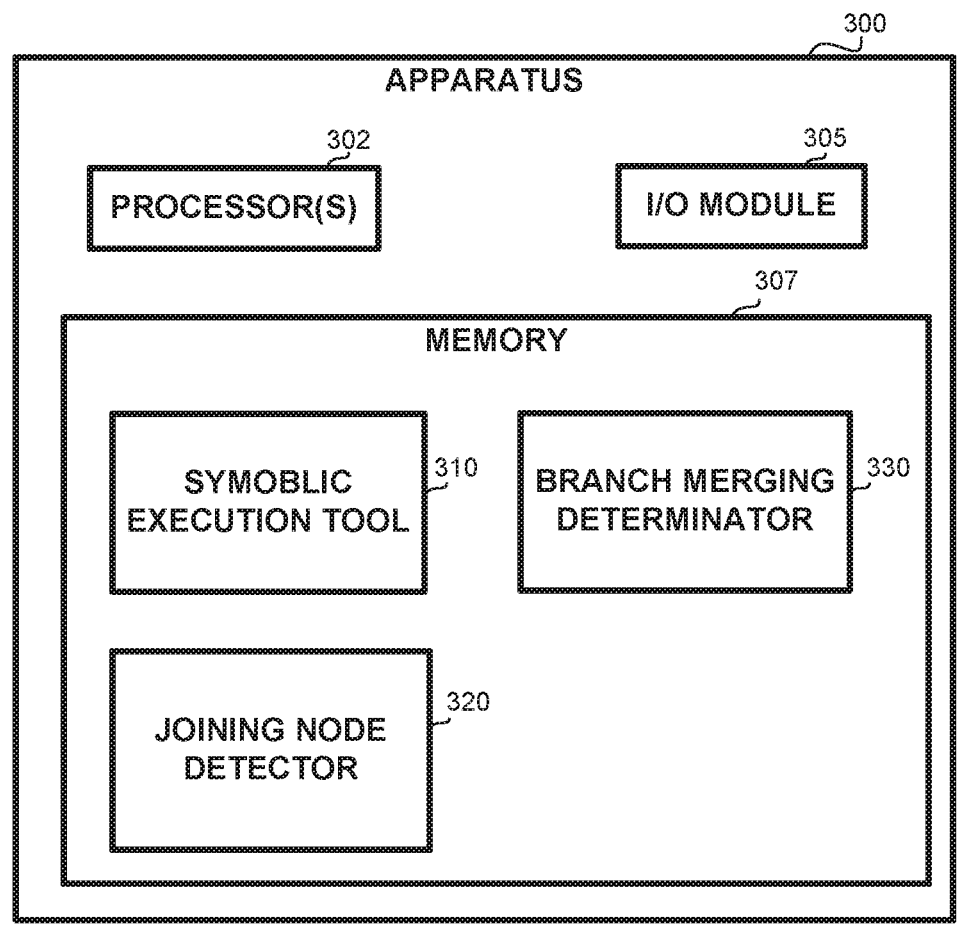
FIG. 3 shows a block diagram of an apparatus, in accordance with some exemplary embodiments of the disclosed subject matter.

Referring now to FIG. 3 showing an apparatus, in accordance with some exemplary embodiments of the disclosed subject matter.

In some exemplary embodiments, Apparatus 300 may be configured to perform symbolic execution of a computer program in accordance with the disclosed subject matter. In some exemplary embodiments, Apparatus 300 may be configured to perform the method of FIG. 2.

Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user, a computerized apparatus or another apparatus similar to Apparatus 300.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

Symbolic Execution Tool 310 may be configured to symbolically execute a computer program. Symbolic Execution Tool 310 may be configured to maintain a symbolic state in accordance with the execution path that is being traversed on a CFG. In some exemplary embodiments, Symbolic Execution Tool 310 may be a Concolic Execution Tool 310 configured to maintain a symbolic state as well as a concrete state.

Joining Node Detector 320 may be configured to detect a joining node for a branching. The joining node may be detected by analyzing the CFG and partitioning the CFG (or portion thereof comprising at least the sub-graph between the branch node and the terminal node of the program) into two sets of nodes such that there's a single edge traversing between nodes in the first set to the second set (e.g., a cut of size one). In some exemplary embodiments, the cut havening a minimal number of nodes in the set that comprises the branching node, may be searched for.

Branch Merging Determinator 330 may be configured to dynamically determine whether or not to merge the branches. Based on a determination to merge branches, Symbolic Execution Tool 310 may be invoked to execute the branches sequentially while conditioning using the branch condition each instruction having a side effect that is not completely internal to the branch.

An Embodiment

Consider the following computer program code:

```
1: int main( )
2: {
3:     int i = 0;
4:     int y = 0;
5:     int cond = nondet_int( );
6:     while (i < 10) {
7:         if (cond > 0)
8:             y = y+1;
9:         else {
10:            y = y-1;
11:            int local=nondet_int( );
12:        }
13:        i = i+1;
14:    }
15:    fv_assert(y == 10 || y == -10);
16: }
```

The following is a non-limiting example of an embodiment of the disclosed subject matter when applied on the program above, described in a step-by-step manner.

Line 3: a memory for the variable i is allocated and it is assigned value 0.

Line 4: a memory for the variable y is allocated and it is assigned value 0.

Line 5: a memory for the variable cond is allocated and it is assigned a nondeterministic value $N_0$.

Line 6: the loop condition (i<10) is tested. The condition holds, so the execution continues to line 7.

Line 7: the branch condition (cond>0) is nondeterministic and both branches are feasible. A determination may be made to merge the branches:

(1) The scope of the branching is identified, and the joining node is found in line 11.

(2) The symbolic execution goes to the then-branch, keeping the condition (cond>0) for this branch.

(3) Line 8: the variable y is assigned its value under the condition of the then-branch. Otherwise, y retains its value (0): $y \leftarrow (cond>0?1:0)$.

(4) Line 11: the joining node is reached from the then-branch. The execution goes to the else-branch, keeping the condition !(cond>0) for this branch.

(5) Line 10: the variable y is assigned its value under the condition of the else-branch. If the condition is not held, it retains its previous value (as defined in Line 8):

$$y \leftarrow (!(cond>0)?-1:(cond>0?1:0))$$

The above expression is equivalent to the following expression:

$$y \leftarrow (!(cond>0)?-1:1).$$

Note, that symbolic execution may simplify expressions once-in-a-while, or keep them non-simplified and let the SAT solver to do all the computation at once.

(5) Line 11: a local variable (local) is assigned a nondeterministic value $N_1$. As the scope of local is internal to the branch, the assignment is performed in an unconditional manner albeit it being performed within a single branch: local $\leftarrow N_1$.

(6) Line 12: the joining node is reached from the else-branch. Symbolic execution exits the branch merging mode and continues as usual.

Line 13: the variable i is assigned its value (without any condition): $i \leftarrow 1$ Line 14: end of loop scope, go back to line 6.

Symbolic execution may continue in the same way for nine more iterations, each time entering the merged branches in line 7 and completing the symbolic execution of merged branches in line 14. For example, at the end of second iteration the variable y will have the following value:

$$y \leftarrow (!(cond>0)?y_1-1:(cond>0?y_1+1:y_1)),$$

where $y_1$ is the value of y after the first iteration: $(!(cond>0)?-1:(cond>0?1:0))$. If the above expression is simplified it may be resolved to be $(!(cond>0)?-2:2)$.

After 10 iterations the loop finishes and the execution reaches line 15. The variable y will have the following value (for simplicity, shown after simplification): $(!(cond>0)?-10:10)$. Therefore, the assertion y==10||y==-10 passes for all inputs.

As can be appreciated from the example instead of having potentially $2^{10}$ execution paths based on the branch within the loop that is iterated 10 times, the disclosed subject matter merges the $2^{10}$ execution paths into a single execution path.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing symbolic execution of a computer program, wherein the symbolic execution traverses a Control Flow Graph (CFG) of the computer program while updating a symbolic state of the computer program, the method comprising:

reaching a branching node in the CFG with a first symbolic state, wherein the branching has at least a first branch and a second branch, wherein the first and second branches end at a joining node in the CFG;

upon reaching the branching node, dynamically determining to perform sequential symbolic execution of the alternative branches, wherein said dynamically determining comprises determining that the first branch and the second branch are feasible according to the first symbolic state;

symbolically executing the first branch using the first symbolic state, whereby a second symbolic state is determined;

symbolically executing the second branch using the second symbolic state, wherein the second symbolic state is an outcome of symbolic execution of the first branch using the first symbolic state, wherein the first branch and the second branch are symbolically executed in a sequential manner whereby a third symbolic state is determined, the third symbolic state is based on sequential symbolic execution of alternative branches; and symbolically executing an instruction at the joining node using a single symbolic state to jointly represent symbolic execution of a first execution path and a second execution path, wherein the first execution path comprises the first branch, wherein the second execution path comprises the second branch.

2. The computer-implemented method of claim 1, wherein the first branch comprises an assignment instruction, wherein the first branch is taken under a first branching condition, wherein said symbolically executing the first branch comprises updating the first symbolic state to reflect a conditional assignment in accordance with the assignment instruction that is conditioned on the first branching condition.

3. The computer-implemented method of claim 2, wherein the assignment instruction is an assignment instruction to a variable having a definition scope that extends beyond the first branch.

4. The computer-implemented method of claim 2, wherein the first branch comprises a second assignment instruction to a local variable, wherein the local variable having a definition scope that is internal to the first branch, wherein said symbolically executing the first branch comprises updating the first symbolic state to reflect an unconditional assignment in accordance with the second assignment instruction.

5. The computer-implemented method of claim 2, wherein the second branch comprises a second assignment instruction, wherein the second branch is taken under a second branching condition, wherein said symbolically executing the second branch comprises updating the second symbolic state to reflect a conditional assignment in accordance with the second assignment instruction that is conditioned on the second branching condition.

6. The computer-implemented method of claim 1, wherein the first branch comprises an instruction having a side effect external to the first branch, wherein the first branch is taken under a first branching condition, wherein said symbolically executing the first branch comprises updating the first symbolic state to reflect execution of the instruction conditioned on the first branching condition.

7. The computer-implemented method of claim 1 further comprises: detecting the joining node, wherein said detecting comprises identifying a cut in a subset of the CFG beginning in the branching node that has a cut size of one.

8. The computer-implemented method of claim 1, wherein the symbolic execution of the computer program is a concolic execution of the computer program comprising a symbolic state and a concrete state.

9. An apparatus for performing symbolic execution of a computer program, wherein the symbolic execution traverses a Control Flow Graph (CFG) of the computer program while updating a symbolic state of the computer program, wherein the apparatus comprising a processor being adapted to perform the steps of:

reaching a branching node in the CFG with a first symbolic state, wherein the branching has at least a first branch and a second branch, wherein the first and second branches end at a joining node in the CFG;

upon reaching the branching node, dynamically determining to perform sequential symbolic execution of the alternative branches, wherein said dynamically determining comprises determining that the first branch and the second branch are feasible according to the first symbolic state;

symbolically executing the first branch using the first symbolic state, whereby a second symbolic state is determined;

symbolically executing the second branch using the second symbolic state, wherein the second symbolic state is an outcome of symbolic execution of the first branch using the first symbolic state, wherein the first branch and the second branch are symbolically executed in a sequential manner whereby a third symbolic state is determined, the third symbolic state is based on sequential symbolic execution of alternative branches; and symbolically executing an instruction at the joining node using a single symbolic state to jointly represent symbolic execution of a first execution path and a second execution path, wherein the first execution path comprises the first branch, wherein the second execution path comprises the second branch.

10. The apparatus of claim 9, wherein the first branch comprises an assignment instruction, wherein the first branch is taken under a first branching condition, wherein said symbolically executing the first branch comprises updating the first symbolic state to reflect a conditional assignment in accordance with the assignment instruction that is conditioned on the first branching condition.

11. The apparatus of claim 10, wherein the assignment instruction is an assignment instruction to a variable having a definition scope that extends beyond the first branch.

12. The apparatus of claim 10, wherein the first branch comprises a second assignment instruction to a local variable, wherein the local variable having a definition scope that is internal to the first branch, wherein said symbolically executing the first branch comprises updating the first symbolic state to reflect an unconditional assignment in accordance with the second assignment instruction.

13. The apparatus of claim 10, wherein the second branch comprises a second assignment instruction, wherein the second branch is taken under a second branching condition, wherein said symbolically executing the second branch comprises updating the second symbolic state to reflect a conditional assignment in accordance with the second assignment instruction that is conditioned on the second branching condition.

14. The apparatus of claim 9, wherein the first branch comprises an instruction having a side effect external to the first branch, wherein the first branch is taken under a first branching condition, wherein said symbolically executing the first branch comprises updating the first symbolic state to reflect execution of the instruction conditioned on the first branching condition.

15. The apparatus of claim 9, wherein the symbolic execution of the computer program is a concolic execution of the computer program comprising a symbolic state and a concrete state.

16. A computer program product for performing symbolic execution of a computer program, wherein the symbolic execution traverses a Control Flow Graph (CFG) of the computer program while updating a symbolic state of the computer program, wherein the computer program product comprising a computer readable storage medium retaining program instructions, which program instructions when read by a processor, cause the processor to perform a method comprising:

reaching a branching node in the CFG with a first symbolic state, wherein the branching has at least a first branch and a second branch, wherein the first and second branches end at a joining node in the CFG;

upon reaching the branching node, dynamically determining to perform sequential symbolic execution of the alternative branches, wherein said dynamically determining comprises determining that the first branch and the second branch are feasible according to the first symbolic state;

symbolically executing the first branch using the first symbolic state, whereby a second symbolic state is determined;

symbolically executing the second branch using the second symbolic state, wherein the second symbolic state is an outcome of symbolic execution of the first branch using the first symbolic state, wherein the first branch and the second branch are symbolically executed in a sequential manner whereby a third symbolic state is determined, the third symbolic state is based on sequential symbolic execution of alternative branches; and symbolically executing an instruction at the joining node using a single symbolic state to jointly represent symbolic execution of a first execution path and a second execution path, wherein the first execution path comprises the first branch, wherein the second execution path comprises the second branch.

* * * * *